United States Patent
Hertz et al.

(10) Patent No.: US 7,093,708 B2
(45) Date of Patent: *Aug. 22, 2006

(54) LINEAR CONVEYOR SYSTEM

(75) Inventors: Roger B. Hertz, Burlington (CA); Daniel C. McCrackin, Hamilton (CA)

(73) Assignee: Thermo CRS Ltd., Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/726,144

(22) Filed: Dec. 1, 2003

(65) Prior Publication Data

US 2004/0178049 A1 Sep. 16, 2004

Related U.S. Application Data

(63) Continuation-in-part of application No. PCT/CA02/00794, filed on May 30, 2002, and a continuation-in-part of application No. 09/870,075, filed on May 30, 2001, now Pat. No. 6,761,262.

(51) Int. Cl.
*B65G 13/02* (2006.01)
*B65G 37/00* (2006.01)

(52) U.S. Cl. ............... 198/803.14; 198/346.2

(58) Field of Classification Search ........... 198/803.14, 198/793, 345.1, 346.2
See application file for complete search history.

(56) References Cited

U.S. PATENT DOCUMENTS

| | | | |
|---|---|---|---|
| 2,740,244 A | 4/1956 | Belli | |
| 3,050,173 A | 8/1962 | Wimmer | |
| 3,138,239 A | 6/1964 | Ackerman et al. | |
| 4,911,286 A | 3/1990 | Herzke | |
| 5,096,670 A | 3/1992 | Harris et al. | |
| 5,101,966 A | 4/1992 | Lapeyre | |
| 5,287,957 A | 2/1994 | Iuchi et al. | |
| 5,346,050 A | 9/1994 | Mojden et al. | |
| 5,774,153 A | 6/1998 | Kuehnle et al. | |
| 6,045,755 A * | 4/2000 | Lebl et al. | 422/65 |
| 6,082,077 A | 7/2000 | Christ | |
| 6,095,316 A | 8/2000 | Redden | |
| RE37,194 E | 5/2001 | Kirk et al. | |
| 6,237,754 B1 | 5/2001 | Tjabringa et al. | |
| 6,267,930 B1 | 7/2001 | Ruediger et al. | |
| 6,761,262 B1 | 7/2004 | Hertz et al. | 198/803.14 |

FOREIGN PATENT DOCUMENTS

DE 43 09 888 A1 9/1994
EP 0 195 907 A2 10/1986

* cited by examiner

*Primary Examiner*—Douglas Hess
(74) *Attorney, Agent, or Firm*—DLA Piper Rudnick Gray Cary US LLP (57) ABSTRACT

A conveyor system for moving articles, such as microtiter plates, includes an endless belt with dividing ribs spaced to accommodate and position the plates to be moved. The belt is driven by a reversible servo motor. The system comprises removable workstations associated with the belt.

14 Claims, 7 Drawing Sheets

LINEAR CONVEYOR SYSTEM

This application is a continuation in part of PCT International application PCT/CA02/00794 filed May 30, 2002, which is a continuation in part of U.S. application Ser. No. 09/870,075 filed May 30, 2001 now U.S. Pat. No. 6,761,262, the contents of which are incorporated herein by reference.

BACKGROUND OF THE INVENTION

1. Field of the Invention

The present invention relates to a conveyor apparatus. More specifically, the invention relates to a conveyor system for linearly transporting articles such as microtiter plates.

2. Description of the Prior Art

Conveyors are well known for moving objects between different locations and typically include an endless belt or chain moving uni-directionally between different stations. The advent of robotic systems has increased the dependency on conveyor systems to move work pieces accurately between different workstations, as human intervention is no longer available to ensure accurate positioning or to make real time adjustments to the location of the work piece.

Where registration of the work piece on a conveyor is necessary, it is known to provide stops alongside the belt conveyor that provide an abutment for the work piece and inhibit relative movement between the work piece and the conveyor belt. Such an arrangement is shown in U.S. Pat. No. 6,095,316 to Redden in which a pair of endless chains or belts are located on opposite sides of a slide way and engage the rear edge of the work piece. Such an arrangement, however, involves a large number of mechanical parts and requires an accurate registration between the chains to obtain correct alignment of the work piece and the conveyor.

One particular area in which the use of robotics has been widely deployed is in the pharmaceutical research laboratory where biological samples, usually contained on microtiter plates, are to be moved between different test equipment without human intervention. In such an environment accurate positioning of the plates is critical and at the same time, the conveyor must be reliable and have as few moving parts as possible to avoid undue complexity.

It is therefore an object of the present invention to provide a conveyor in which the above disadvantages are obviated or mitigated.

SUMMARY OF THE INVENTION

According, therefore, to one aspect of the present invention, there is provided a conveyor for moving at least one article along a predetermined path the conveyor having an endless belt entrained about a pair of supports spaced apart along the path. A support surface on the belt receives the article, and a drive mechanism moves the belt relative to the supports along the path. The support surface has a pair of abutments to inhibit relative movement between the article and the belt along the predetermined path.

According to a further aspect of the invention, there is provided a conveyor system to move an article along a predetermined path. The system comprises a pair of workstations and a conveyor extending along the predetermined path between the pair of workstations. The conveyor has an endless belt entrained about a pair of supports spaced apart along the path with a support surface on the belt to receive the article. A drive mechanism moves the belt relative to the supports along the path. The support surface having a pair of abutments positioned on the belt to engage oppositely directed surfaces on the article and inhibit relative movement between the belt and the article along the path.

In another embodiment, the invention provides a conveyor system for moving articles along a predetermined path between one or more workstations, the system comprising:
an conveyor belt extending between a drive pulley and an idler pulley, the belt including an upper, article supporting surface a lower pulley engaging surface;
a support structure for the belt and the pulleys; and
a drive mechanism for driving the drive pulley;
wherein the article supporting surface of the conveyor belt includes a pair of abutments for receiving the article and for maintaining the article in position as the belt moves the article along the predetermined path.

BRIEF DESCRIPTION OF THE DRAWINGS

An embodiment of the invention will now be described by way of example only with reference to accompanying drawings in which.

DESCRIPTION OF THE PREFERRED EMBODIMENTS

Figure 1:
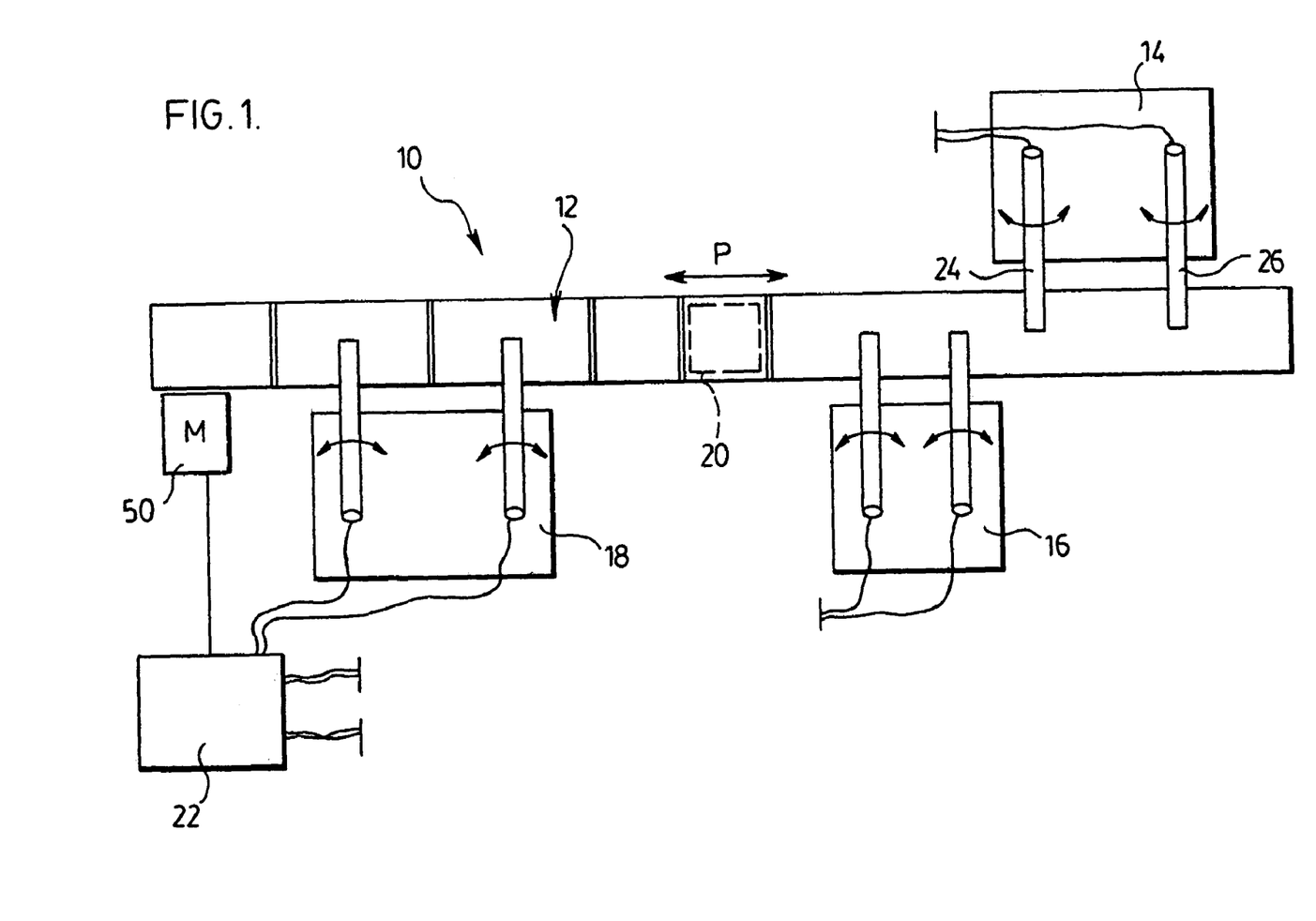
FIG. 1 is a schematic representation of a conveyor system.

Referring therefore to FIG. 1, a conveyor system 10 includes a conveyor 12 extending between workstations 14, 16, and 18. The conveyor 12 moves articles 20 along a predetermined path indicated by the arrow "p" between respective ones of the workstations 14, 16 and 18 under the control of a controller 22. For the purpose of brevity, an embodiment of the invention comprising three workstations is described herein. However, it will be understood that any number of such workstations can be provided with the conveying system of the present invention.

Each of the workstations 14, 16 and 18 has a pair of robotic arms 24, 26 controlled through the controller 22 to perform specific operations on the articles 20. Each of the arms 24, 26 is independently controlled for operation on the articles 20 and it will be appreciated that the nature of the operations and the nature of the arms 24, 26 will depend upon the articles to be conveyed. The details of the arms 24, 26 and their specific operations are well known in the art and need not be further described at this time. Although the present disclosure refers to robotic arms, it will be understood that any type of robotic mechanism can be incorporated with the present invention for acting on the articles being transported. Further, although two robotic arms or mechanisms are described herein, it will be understood that any number of such devices can be provided depending upon the need.

Figure 2:
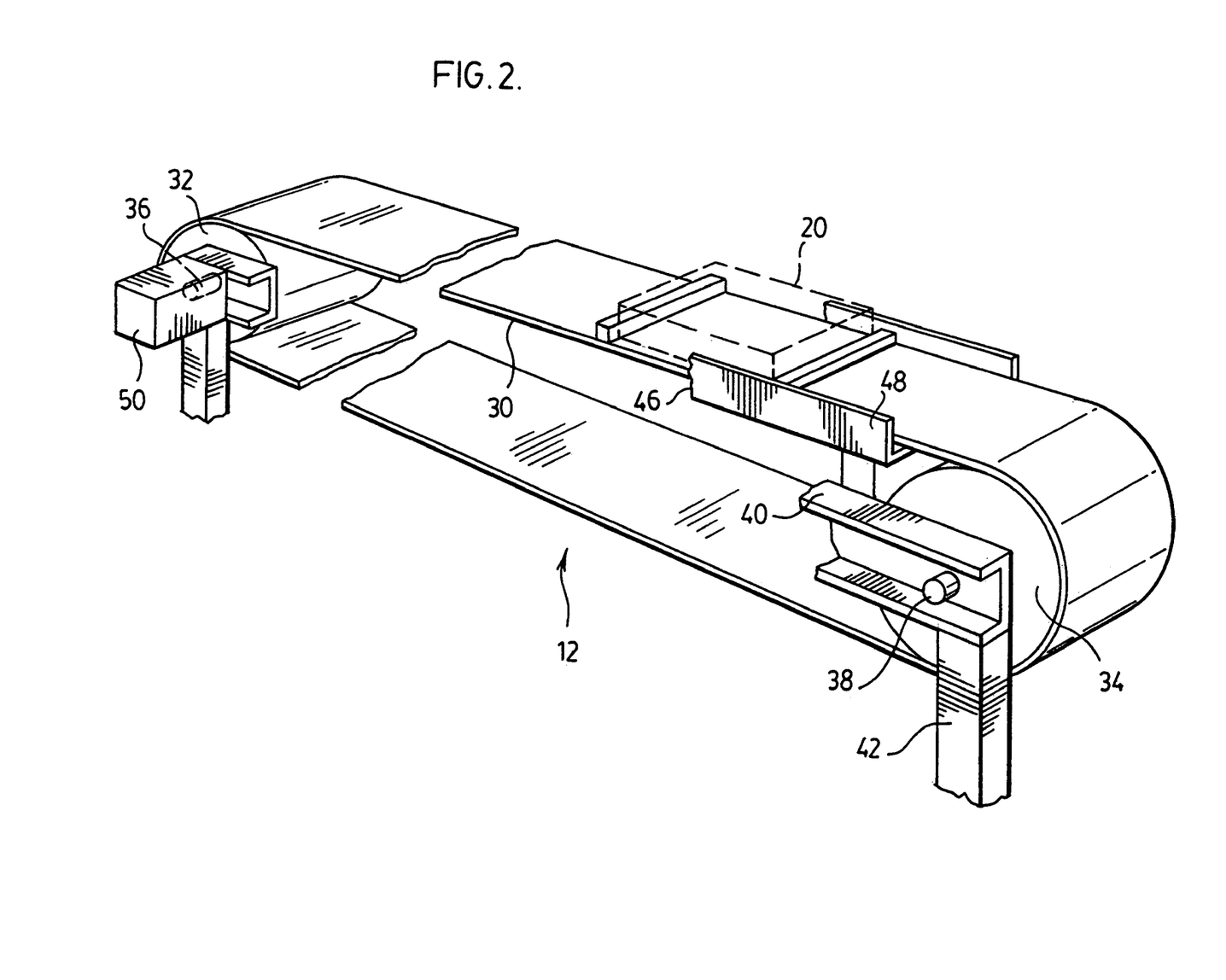
FIG. 2 is a perspective view of a portion of the conveyor system shown in FIG. 1.
Figure 3:
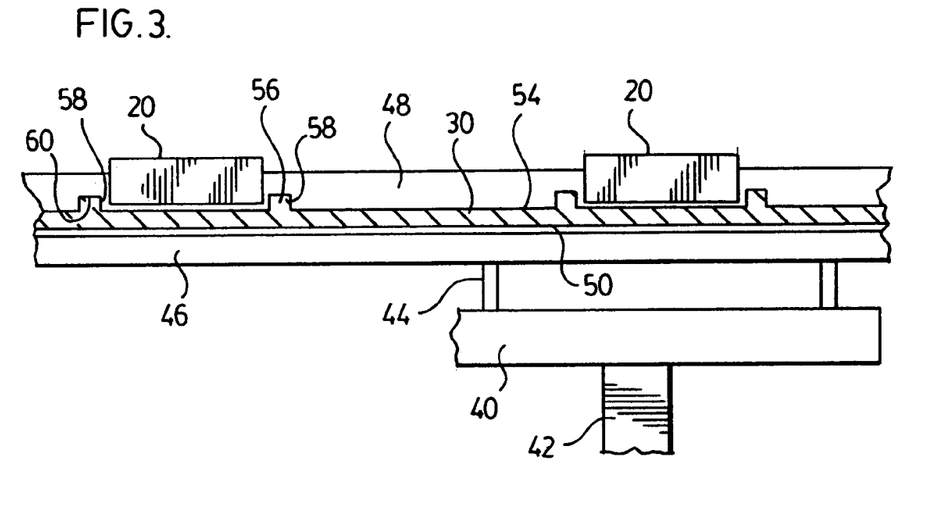
FIG. 3 is a longitudinal cross sectional view of the system of FIG. 2.

As can best be seen in FIG. 2, the conveyor 12 includes an endless belt 30 entrained about a pair of support rollers 32, 34. The rollers 32, 34 are rotatably mounted on spindles 36, 38 respectively and are maintained in spaced relationship by side frames 40 that extend along the length of the conveyor 12. The side frames 40 are supported on legs 42 to maintain the conveyor 12 at the required height and cross members 44 maintain the side frames 40 in spaced relationship. The belt 30 is supported between the rollers 32 on a slide 46, which is supported on the cross members 44. The slide 46 may be made of a suitable low friction material such as a high-density polyethylene that allows the belt 30 to slide smoothly between the rollers. Side rails 48 are secured to the slide 46 and project above the belt 12 to locate articles 20 laterally relative to the belt.

A drive mechanism such as a servo motor 50 is secured to the spindle 36 associated with the roller 32 and rotates the roller 32 to impart linear motion to the belt 30. The servo motor 50 is reversible and is controlled by a controller to move the belt 30 in either direction along the path P. In the preferred embodiment, the controller for the drive mechanism is controller 22 as described earlier, which is the controller for the robotic arms. In this way, the relative movement of the arms and the belt can be more easily coordinated. Although the present description is directed to the use of a single controller for both the belt and the robotic mechanisms, it will be understood that multiple controllers, each coordinated with one another, may also be used. The servo motor 50 will be controlled from the controller 22 using standard closed loop control techniques implemented by the controller so that the position of a particular location on the belt 30 is known at any given time. Such controllers and servo motors are readily available, such as those available from Kollmorgen of Radford, Va.

Figure 4:
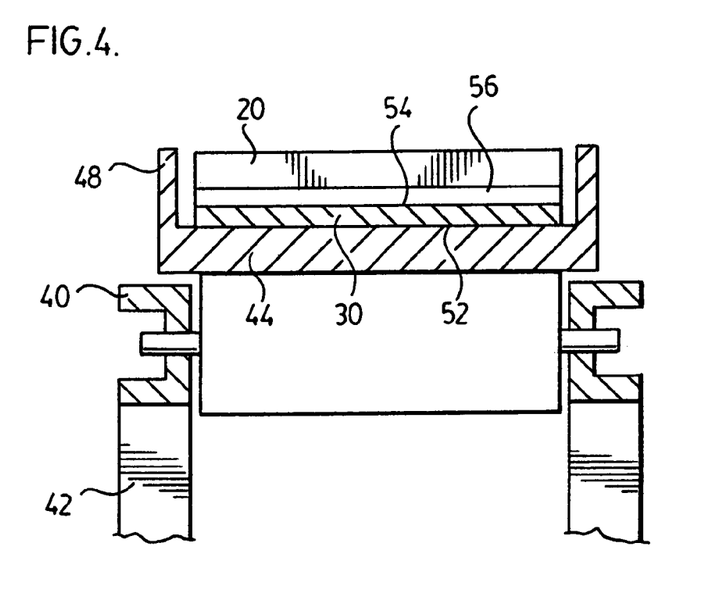
FIG. 4 is a transverse cross sectional view of the system of FIG. 2.

The endless belt 30 has oppositely directed surfaces, namely a drive surface 52 and support surface 54, as shown in FIG. 4. The drive surface 52 cooperates with the rollers 32, 34 and slide 46, whereas the support surface 54 supports the articles 20. Ribs 56 are provided on the support surface 54 at spaced intervals and extend laterally across the belt 30 in a direction normal to the predetermined path P. The ribs 56 in one preferred embodiment are of square cross section having side faces 58 and an upper face 60. The ribs 56 are arranged in pairs along the length of the belt 30 with opposed side faces 58 of each pair spaced apart a distance slightly greater than the overall length L of the article 20 to thereby create a "nest" for the article being transported. The spacing between the opposed side faces 58 provides a snug fit for the article 20 without unduly hampering the placement and removal of the article 20 on the belt 30. The side faces 58 provide abutments for the article 20 and thereby inhibit relative movement between the belt 30 and the article 20 along the path P. As will be discussed further below, the upper edges of the ribs may be provided with bevels to facilitate the placement of the article 20 into the "nest" between the pair of ribs 56.

In operation, the servo motor 50 moves the belt 30 such that a pair of ribs are positioned at one of the workstations 14, 16, 18 at which an article is to be placed on the belt 30. The arm, or robotic mechanism, 24 places the article on the belt so that it is received between the ribs 56 and thereby secured against unintentional movement. At the same time, articles located at other workstations 14, 16, 18 may operated upon by the respective arms 24, 26 either by removal and replacement with an alternate article or a specific operation performed by the arm or robotic mechanism on that article. In one embodiment, a robotic arm or mechanism may simply perform an action on the article without necessarily removing it from the belt.

After completion of the operation by the arms 24, 26 at each of the work stations 14, 16, 18, the servo motor 50 under the control of the controller 22 drives the belt 30 to position the article adjacent another of the arms 24, 26. This may be another arm at the same workstation or may be moved to a different workstation for further operation to be performed. Again, once the set of operations at each workstation is completed, the controller 22 operates through the servo motor to move the article 20 to another position.

Movement of the belt 30 may be in either direction by virtue of the reversible nature of the servo motor 50 with the location of the articles 20 on the belt secured in either direction by the abutments provided by the ribs 56. The side rails 48 prevent lateral displacement so that the article 20 is securely located on the belt 30. The article 20 may thus be moved between workstations in either direction permitting operations to be performed at each workstation by each of the robotic arms independently of the other operations. Upon completion of the operations on the article, it is moved to an arm 24, 26 for removal from the belt at which time, a further article may be placed on the belt by another one of the arms.

A typical application for the conveyor system 10 is found in laboratory, such as a pharmaceutical research laboratory, where the article 20 comprises a microtiter plate. In such case, the operations performed by the robotic mechanisms, or arms involve the placement and removal of the plates from the belt and test operations performed on the contents of the plates. In such an application, the plates typically have dimensions of length 5.030" by 3.365" and a depth of 0.565". With such an embodiment, it has been found that the appropriate spacing between the opposing side faces 58 of the ribs 56 forming the "nest" for the plates have a clearance of 0.040" over the overall length to facilitate placement of the articles 20. It will be understood that too great a clearance may lead to relative movement of the plate over the conveyor belt, which may lead to inaccurate handling of the plate by the robotic mechanisms. Further, it will be understood that too tight a clearance may lead to difficulties in placing or removing the plate in the nests, although this may also depend upon the coefficient of friction of the belt and plate materials. The particular clearance for a specific application will be apparent to persons skilled in the art.

In the preferred embodiment the belt 30 is a flexible urethane belt and the ribs 56 are urethane blocks. Clearly, custom belts may be provided from a suitable flexible structure such as a nylon reinforced polymer with the ribs 56 molded integrally with the support surface 54. The ribs may be of other suitable forms, for example a series of buttons or ledges rather than a continuous rib if preferred.

As shown in the accompanying figures, the ribs are arranged as discrete pairs along the length of the support surface. In an alternative embodiment where the desired spacing of the articles permits, each of the ribs may separate adjacent articles so that a continuous array of articles is provided. Each of the side faces 58 then acts as an abutment.

It will be noted that the conveyor 12 provides a simple but effective mechanism for moving articles 20 in either direction along the path between workstations. Joint operation of the robotic arms is facilitated and the use of the reversible servo motor avoids complicated mechanisms for moving the belt.

Figure 5:
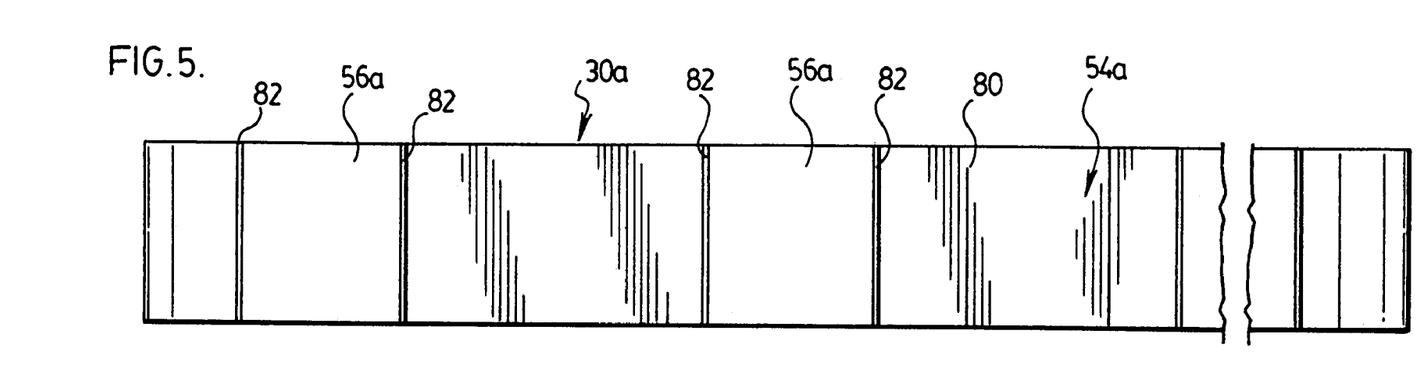
FIG. 5 is a plan view of one embodiment of a belt for use with the conveyor system of the present invention.
Figure 6:
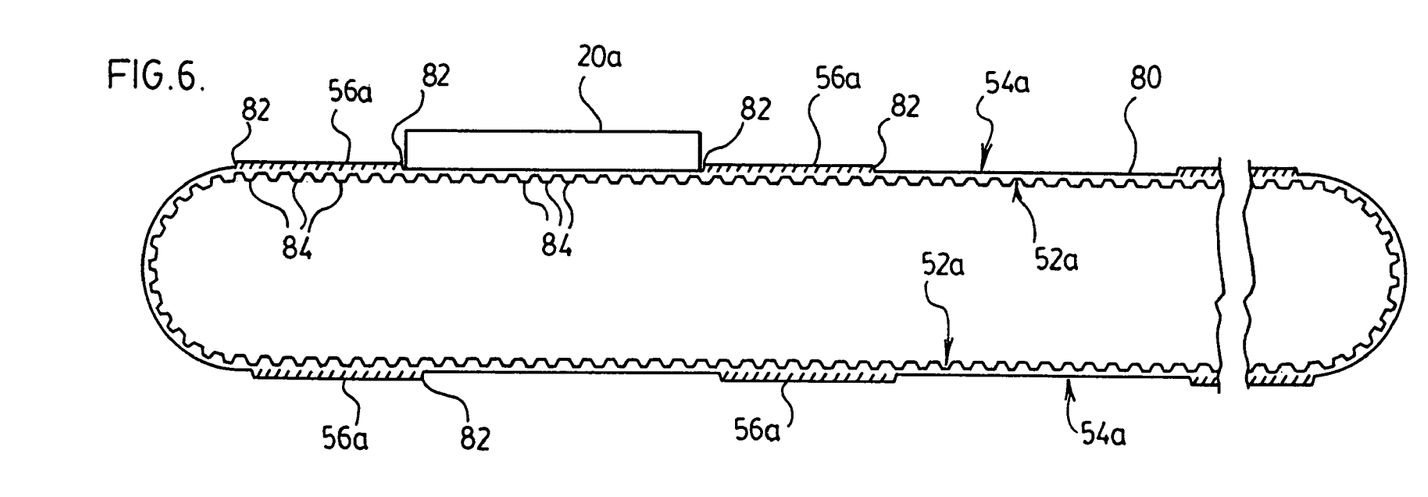
FIG. 6 is a side elevation of the belt of FIG. 5.

FIGS. 5 and 6 illustrate details of the belt of the invention according to a preferred embodiment and wherein similar reference numerals are used as with the previously described figures but with the letter "a" added for clarity. As shown, the belt 30a includes a drive surface 52a and a support surface 54a. The ribs 56a according to the illustrated embodiment, also extend laterally across the width of the belt, on the support surface 54a thereof, as described above. However, in this embodiment, the ribs 56a also partly extend along the longitudinal direction of the belt, thereby resulting in ribs 56a that assume a pad-like appearance on the belt 30a. The spaces between the ribs 56a provide for "nests" 80 for receiving the articles 20a, as described before. As indicated above, such articles 20a may comprise, for example, microtiter plates as illustrated.

The belt 30a illustrated in FIGS. 5 and 6 allow for the articles 20a to be placed on the belt 30a such that they are spaced apart by a greater distance than in the embodiment described previously. It will be understood by persons skilled in the art that the size of the ribs 56 or 56a will vary on the desired spacing of the articles 20a being transported and, as such, any size of same may be used.

As also illustrated in FIG. 6, the side faces of the ribs are preferably provided with bevelled edges 82, which facilitate the positioning of the article 20a into the "nests" 80 on the belt 30a.

The belt 30a illustrated in FIG. 6 also preferably includes cogs 84 on the drive surface 52a that cooperate with complementary cogs on the rollers (not shown).

Figure 7:
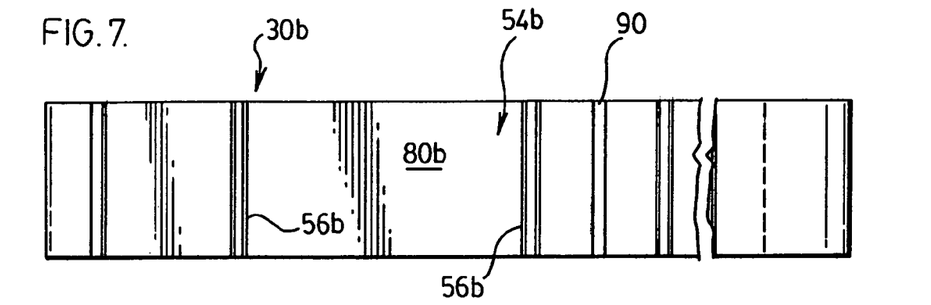
FIG. 7 is a plan view of another embodiment of a belt for use with the conveyor system of the present invention.
Figure 8:
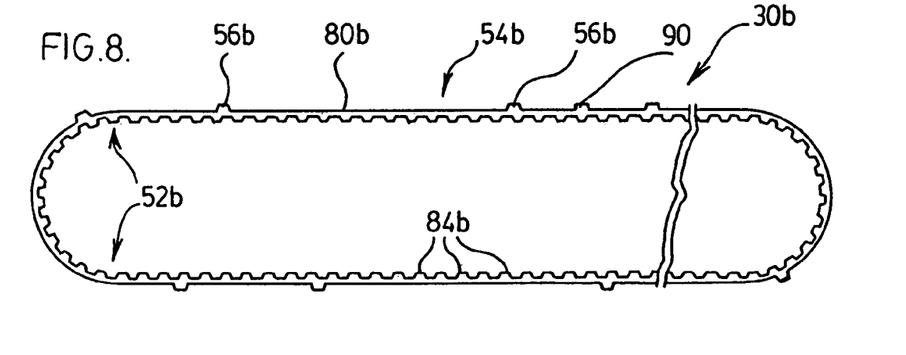
FIG. 8 is a side elevation of the belt of FIG. 7.

Another embodiment of the conveyor belt of the invention is illustrated in FIGS. 7 and 8, wherein similar reference numerals as above are used to identify similar elements, but with the letter "b" used for clarity. In the embodiment shown, the ribs 56b are narrower than those of the previously described embodiment and appear as cleats on the support surface 54b of the belt 30b. However, a nest, 80b, is still provided between a pair of ribs for receiving a plate to be transported. In this embodiment, an example of dimensions would include a nest length of 5.07", which corresponds to the length of a standard microtiter plate but with an allowance for a non-frictional fit.

FIGS. 7 and 8 also illustrate the provision of a homing cleat or rib, 90, which serves to register the position of the nests as the belt is moved. Such homing cleats are known in the art and may comprise a metal body that can be registered by a magnetic means associated with the conveyor device. The homing cleat is also used to "zero" the belt upon start-up of the conveyor device so that accurate positioning of the various nests can be made.

Figure 9:
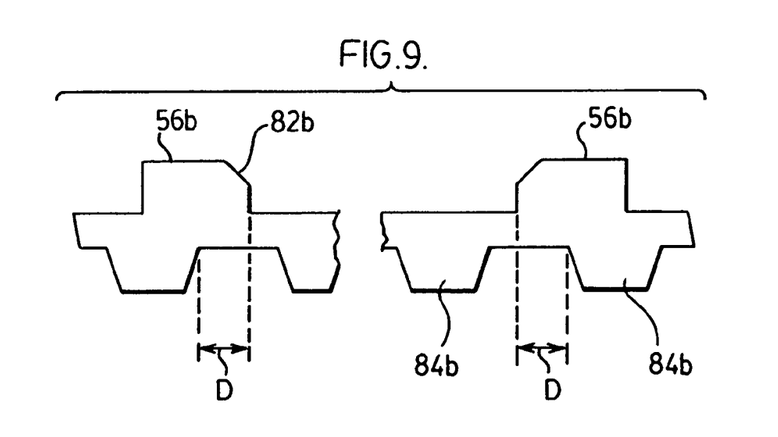
FIG. 9 is a side elevation of a portion of the belt of FIG. 7.

FIG. 9 illustrates a detail of the ribs or cleats 56b and the cogs 84b of the belt 30b shown in FIGS. 7 and 8. As can be seen, the cleats 56b include a bevelled upper edge 82b on the side of the cleat facing the nest. In this manner, positioning of the plate in the nest is assisted with the adjacent bevelled edges 82b being used to guide the plate into the nest. In a preferred embodiment, the bevel is 45°.

It will be understood that the ribs or cleats 56b of the belt 30b would preferably be positioned on the belt 30b in reference to the size and pitch of the cogs 84b of the drive surface 52b of the belt. That is, the cleats 56b will generally be offset from adjacent cogs 84b by a distance D as shown in FIG. 9. For example, in one embodiment, both the cleats 56b and the cogs 84b are 0.25" wide (taken along the longitudinal direction of the belt), and the cleats 56b are spaced 0.12" from the cogs (that is, for this example, D would 0.12"). It will be understood that these dimensions will vary depending upon the pitch and size of the cogs and cleats and that appropriate sizing will be apparent to persons skilled in the art.

Figure 10:
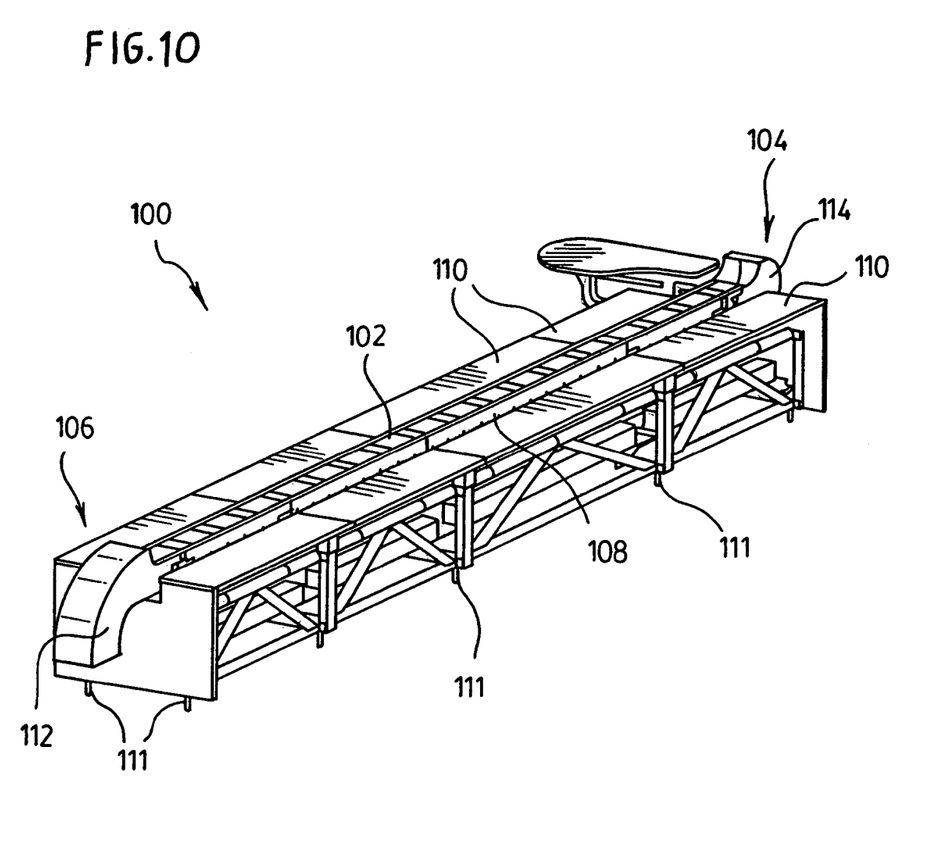
FIG. 10 is a perspective view of a conveyor system according to one embodiment of the invention.

FIG. 10 illustrates an example of the conveyor device of the present invention when used in an apparatus 100. The conveyor belt of the invention is shown at 102. The apparatus includes a loading end 104 and a discharge end 106. The apparatus comprises the belt 102 and a frame 108, which supports the belt and a drive mechanism for same. On each side of the belt 102, are provided a plurality of work stations 110. Each work stations essentially comprises a table or platform that is positioned along the side of the belt and on which can be positioned any desired robotic mechanism (such as a robotic arm as described above) or other needed equipment. Although the apparatus of FIG. 10 indicates an embodiment where workstations are located on both sides of the belt 102, it will be appreciated that such stations can also only be provided on one side of the belt and that the number and positioning of such workstations will vary depending upon the need. For example, where a space is needed for access, one of the stations can be removed. As will be understood, such modularity allows the system and apparatus of the invention to be used in any number of ways.

As shown in FIG. 10, the entire apparatus may be supported on adjustable legs 111 so as to enable the height of the belt and workstations to be adjusted as needed. The embodiment of FIG. 10 also illustrates an optional chute 112 for diverting any articles, i.e. microtiter plates, that are to be discarded off the conveyor. In another embodiment, the chute 112 can be replaced with a plate catcher. A plate catcher is shown in FIG. 10 as element 114. As will be understood, the purpose of the catcher 114 is to capture any plates that are ejected from the belt.

Figure 11:
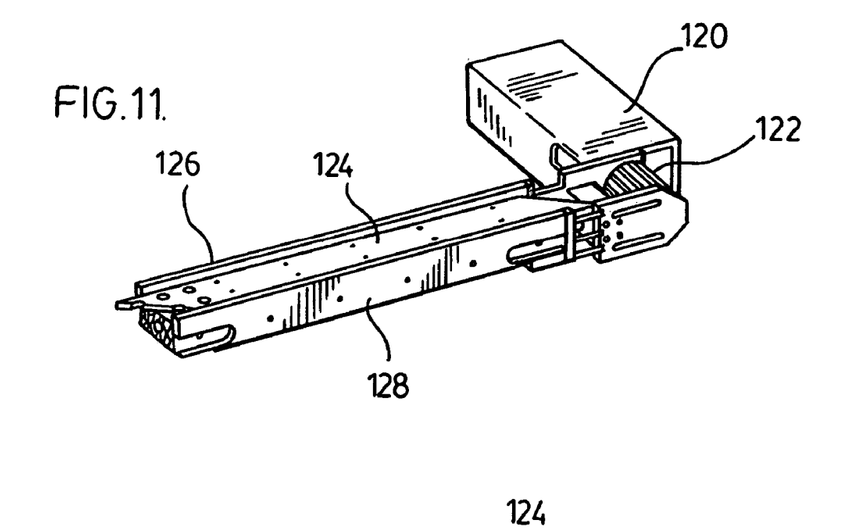
FIG. 11 is a perspective view of a portion of the system of FIG. 10 illustrating the drive mechanism.
Figure 12:
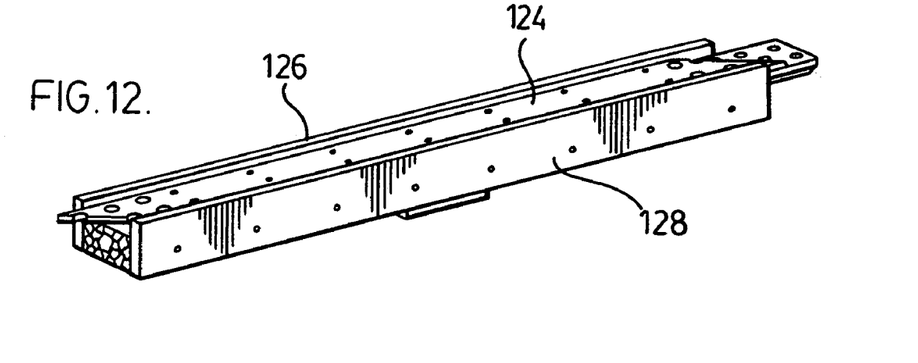
FIG. 12 is a perspective view of a mid portion of the system of FIG. 10; and, FIG. 13 is a perspective view of a portion of the system of FIG. 10 illustrating the idler end of the system.
Figure 13:
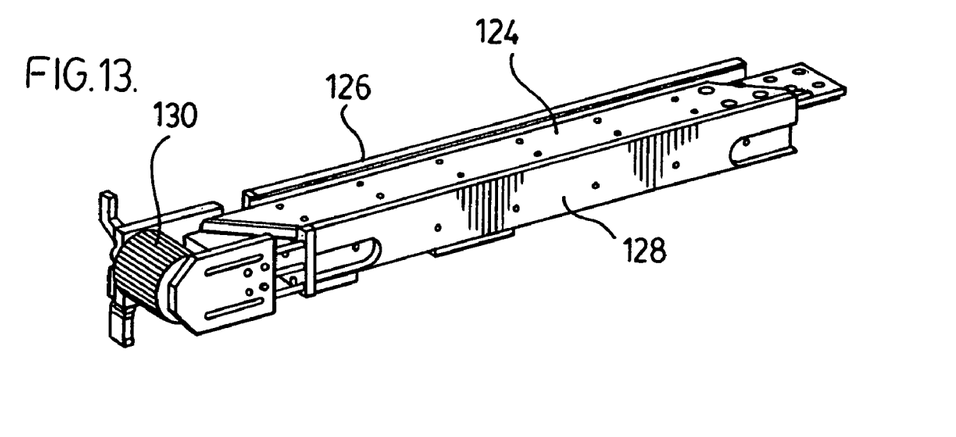

FIGS. 11 to 13 illustrate details of a preferred support structure and drive mechanism for the conveyor belt of the invention. The components illustrated in these figures would be, for example, that used in the apparatus of FIG. 10.

FIG. 11 illustrates the drive section of conveyor system, which includes a drive motor contained within a housing 120. A drive arm projecting from the housing 120 is provided with a drive pulley 122. As shown, the drive pulley 122 comprises a generally cylindrical body with a plurality of ribs extending longitudinally along the body and generally parallel with the longitudinal axis thereof. It will be understood that the ribs are designed to engage the cogs provided on the belt (not shown) of the conveyor. In this manner, when the drive motor is actuated, the rotation of the drive pulley 122 serves to move the belt as described above.

FIG. 11 also illustrates the support 124 upon which the conveyor belt rests. In the preferred embodiment, since the belt slides over the support 124, the support will be made of a material that avoids excessive friction. In the preferred embodiment, the support structure for the belt also includes a pair of side walls 126 and 128 that extend along the length of the conveyor belt. In a more preferred embodiment, the side walls 126 and 128 extend above the support 124 and over the belt (not shown). In this manner, the top edges of the side walls 126 and 128 serve as lateral positioning guides for the plates being transported by the belt and also serve to restrict lateral movement of the plates off the belt. As described above, ribs or cleats on the belt serve to restrict longitudinal movement of the plates with respect to the belt. In this manner, the plates are maintained on the belt and in the desired position.

FIG. 12 illustrates the mid portion of the conveyor support structure.

FIG. 13 illustrates the non-driving end, or idler end of the conveyor system. In this case, a preferably freely rotating idler pulley 130 is provided on an axle (not shown). The conveyor belt of the system is wrapped around the idler pulley to complete the structure. As shown, the idler pulley 130, like the drive pulley 122 described above, comprises a generally cylindrical body and is preferably provided with a plurality of longitudinally extending ribs for engaging the cogs on the conveyor belt. As will be appreciated, the idler pulley may also simply have a smooth exterior surface.

Although the invention has been described with reference to certain specific embodiments, various modifications thereof will be apparent to those skilled in the art without departing from the spirit and scope of the invention as outlined in the claims appended hereto.

We claim:

1. A conveyor system to move an article along a predetermined path, comprising two or more workstations, a conveyor extending along said predetermined path between said workstations, said conveyor having an endless belt entrained about a pair of supports spaced apart along said path, a support surface on said belt to receive said article and a drive mechanism to move said belt relative to said supports along said path, said drive mechanism including a reversible servo motor to move said belt in either direction along said path and to position said belt relative to said workstations said workstations including robotic arms independently ajustable to operate upon the article on said belt, said support surface having a pair of abutments positioned on said belt to engage oppositely directed surfaces on said article and inhibit relative movement between said article and said belt along said path.

2. The conveyor system according to claim 1 wherein said article comprises a microtiter plate.

3. The conveyor system of claim 1 wherein:
said conveyor belt extends between a drive pulley, connected to said drive mechanism, and an idler pulley, said belt including a lower pulley engaging surface; and wherein said system includes a support structure for said belt and said pulleys.

4. The system of claim 3 wherein said support structure includes a pair of side rails that extend along the length of said belt and rise above the article supporting surface, whereby said article is maintained on said belt as the belt is moved.

5. The system of claim 3 wherein said pulley engaging surface includes a plurality of cogs for engaging complementary ribs extending from said drive pulley.

6. The system of claim 1 wherein upper edges of said abutments are bevelled for guiding said article onto the belt.

7. The system of claim 3 wherein at least one of said abutments on said belt includes a registration means for monitoring the position of said belt as it moves.

8. The system of claim 7 wherein said at least one abutment includes a magnet and wherein said system includes a magnetic detector.

9. The system of claim 3 further including an article loading means and an article discharge means.

10. A conveyor system to move microtiter articles along a predetermined path, the system comprising a pair of workstations, a conveyor extending along said predetermined path between said pair of workstations, said conveyor having an endless belt entrained about a pair of supports spaced apart along said path, a support surface on said belt to receive said articles and a drive to move said belt relative to said supports along said path, said support surface having a pair of raised abutments positioned on said belt to engage oppositely directed surfaces on said articles and inhibit relative movement between said articles and said belt along said path, wherein said drive comprises a servo motor to position said belt relative to said workstations and wherein said servo motor is reversible to move said belt in either direction along said path.

11. A conveyor system according to claim 10 wherein each of said workstations includes a robotic arm, said arms being independently adjustable to operate upon said articles on said belt.

12. The system of claim 11 wherein said robotic arm places and removes said articles between said pair of abutments on said belt.

13. The system of claim 10 wherein said belt provides planar surfaces extending between said abutments to engage and support a bottom surface of said articles.

14. The system of claim 10 wherein said servo motor is controlled by a controller for positioning said articles on the belt in desired locations along said path.

* * * * *